(12) United States Patent
Furukawa et al.

(10) Patent No.: US 11,352,466 B2
(45) Date of Patent: Jun. 7, 2022

(54) RESIN COMPOSITION, HEAT STORAGE MATERIAL, AND COMMODITY

(71) Applicant: HITACHI CHEMICAL COMPANY, LTD., Tokyo (JP)

(72) Inventors: Naoki Furukawa, Tokyo (JP); Akira Nagai, Tokyo (JP); Tsuyoshi Morimoto, Tokyo (JP); Keiko Kizawa, Tokyo (JP); Nozomi Matsubara, Tokyo (JP)

(73) Assignee: SHOWA DENKO MATERIALS CO., LTD., Tokyo (JP)

( * ) Notice: Subject to any disclaimer, the term of this patent is extended or adjusted under 35 U.S.C. 154(b) by 61 days.

(21) Appl. No.: 16/612,120

(22) PCT Filed: May 10, 2018

(86) PCT No.: PCT/JP2018/018143
§ 371 (c)(1),
(2) Date: Nov. 8, 2019

(87) PCT Pub. No.: WO2018/207876
PCT Pub. Date: Nov. 15, 2018

(65) Prior Publication Data
US 2020/0165437 A1    May 28, 2020

(30) Foreign Application Priority Data

May 12, 2017  (JP) .............................. JP2017-095528
Nov. 6, 2017  (WO) .................. PCT/JP2017/039950

(51) Int. Cl.
*C08L 33/08*        (2006.01)
*C08J 3/24*         (2006.01)
(Continued)

(52) U.S. Cl.
CPC ........... *C08J 3/24* (2013.01); *C08F 220/1804* (2020.02); *C08F 220/1812* (2020.02);
(Continued)

(58) Field of Classification Search
CPC ........................ C08L 33/08; C08F 220/1818
See application file for complete search history.

(56) References Cited

U.S. PATENT DOCUMENTS

2010/0264353 A1  10/2010  Hartmann et al.
2012/0225290 A1   9/2012  Hartmann et al.
2016/0237325 A1   8/2016  Ellringmann et al.

FOREIGN PATENT DOCUMENTS

CN     102123857 A    7/2011
CN     103038260 A    4/2013
(Continued)

OTHER PUBLICATIONS

D.K Dogusku, "Synthesis of High Molecular Weight Polystearylacrylate and Polystearylmethacrylate Polymers via ATRP Method as Thermal Energy Storage Materials", International Journal of Engineering and Applied Sciences (IJEAS) Retrieved from the Internet: URL:https://media.neliti.com/media/publications/257962-synthesis-of-high-molecular-weight-polys-ac0661bc.pdf [retrieved on Feb. 3, 2021], Apr. 1, 2015, p. 2394-p. 3661, XP055771660 (cited in an office action dated Jun. 24, 2021 in counterpart EP Patent Application No. 18798106.3).

*Primary Examiner* — Michael M Dollinger
(74) *Attorney, Agent, or Firm* — Fitch, Even, Tabin & Flannery, LLP

(57) ABSTRACT

An aspect of the present invention is a resin composition comprising: an acrylic resin; and a curing agent, wherein the acrylic resin is a resin obtained by polymerizing monomer components comprising a first monomer represented by the following formula (1):

(Continued)

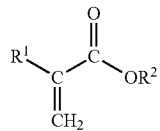

(1)

wherein $R^1$ represents a hydrogen atom or a methyl group, and $R^2$ represents an alkyl group having 12 to 30 carbon atoms, and a second monomer copolymerizable with the first monomer and having a reactive group capable of reacting with the curing agent.

14 Claims, 3 Drawing Sheets

(51) Int. Cl.
*C08F 220/18* (2006.01)
*C08F 220/32* (2006.01)
*C08K 5/3445* (2006.01)
*C08L 33/10* (2006.01)

(52) U.S. Cl.
CPC .... *C08F 220/1818* (2020.02); *C08F 220/325* (2020.02); *C08K 5/3445* (2013.01); *C08L 33/08* (2013.01); *C08L 33/10* (2013.01); *C08L 2201/00* (2013.01)

(56) References Cited

FOREIGN PATENT DOCUMENTS

| CN | 105765018 A | | 7/2016 |
|---|---|---|---|
| JP | H5-230435 A | | 9/1993 |
| JP | H10-060423 A | | 3/1998 |
| JP | 2000-109787 A | | 4/2000 |
| JP | 2004-027189 A | | 1/2004 |
| JP | 2005-023229 A | | 1/2005 |
| JP | 2006152275 A | * | 6/2006 |
| JP | 2008-163286 A | | 7/2008 |
| JP | 2011-046868 A | | 3/2011 |
| JP | 2011-528293 A | | 11/2011 |
| JP | 2014-095023 A | | 5/2014 |
| JP | 2016-089065 A | | 5/2016 |
| JP | 2016141764 A | * | 8/2016 |
| JP | 2016-197679 A | | 11/2016 |

* cited by examiner (a)

(b)

RESIN COMPOSITION, HEAT STORAGE MATERIAL, AND COMMODITY

CROSS-REFERENCE TO RELATED APPLICATIONS

This application is a U.S. national phase application filed under 35 U.S.C. § 371 of International Application No. PCT/JP2018/018143, filed May 10, 2018, designating the United States, which claims priority from International Application No. PCT/JP2017/039950, filed Nov. 6, 2017, and Japanese Patent Application No. 2017-095528, filed May 12, 2017, which are hereby incorporated herein by reference in their entirety.

TECHNICAL FIELD

The present invention relates to a resin composition, a heat storage material, and an article.

BACKGROUND ART

A heat storage material is a material that can extract stored energy as heat as required. This heat storage material is used in applications such as air conditioning equipment, floor heating equipment, refrigerators, electronic components such as IC chips, automobile interior and exterior materials, automobile parts such as canisters, and heat insulation containers.

As a method for storing heat, latent heat storage using phase change of a substance is widely used in terms of the amount of heat. Water-ice is well known as a latent heat storage material. Water-ice is a substance with a large amount of heat, but its phase change temperature is limited to 0° C. in the atmosphere, so the application range is also limited. For this reason, paraffins are used as a latent heat storage material having a phase change temperature higher than 0° C. and 100° C. or less. However, since paraffins change its phase by heating and become liquid and there is a risk of ignition and firing, in order to use paraffins as a heat storage material, it is necessary to prevent the paraffin from leaking out from the heat storage material by storing in a sealed container such as a bag, and thus the fields of application are limited.

Therefore, as a method for improving a heat storage material including paraffins, for example, a method using a gelling agent is disclosed in Patent Literature 1. A gel produced by this method can remain as a gel molded product even after the phase change of paraffins. However, in this method, liquid leakage, volatilization of the heat storage material, and the like may occur when used as the heat storage material.

As another improvement method, for example, a method using a hydrogenated conjugated diene copolymer is disclosed in Patent Literature 2. In this method, the shape can be maintained in the vicinity of the melting or solidification temperature of the hydrocarbon compound, but when the temperature is further increased, the compatibility becomes low, so that phase separation occurs and liquid leakage of the hydrocarbon compound occurs.

As another improvement method, for example, a method of encapsulating a heat storage material is disclosed in Patent Literature 3. In this method, since the heat storage material is encapsulated, the handling properties are good regardless of the phase change, but there is a concern that the heat storage material oozes out of the capsule in a high temperature range.

CITATION LIST

Patent Literature

Patent Literature 1: Japanese Unexamined Patent Publication No. 2000-109787
Patent Literature 2: Japanese Unexamined Patent Publication No. 2014-95023.
Patent Literature 3: Japanese Unexamined Patent Publication No. 2005-23229

SUMMARY OF INVENTION

Technical Problem

In an aspect, the present invention aims to provide a resin composition suitably used for a heat storage material. In another aspect, the present invention aims to provide a heat storage material having an excellent heat storage capacity.

Solution to Problem

As a result of intensive studies, the present inventors have found that a resin composition containing a specific component is suitably used as a heat storage material, that is, that a heat storage material formed from the resin composition has an excellent heat storage capacity, thereby completing the present invention. In some aspects, the present invention provides the following [1] to [18].

[1] A resin composition comprising: an acrylic resin; and a curing agent, wherein the acrylic resin is a resin obtained by polymerizing monomer components comprising a first monomer represented by the following formula (1):

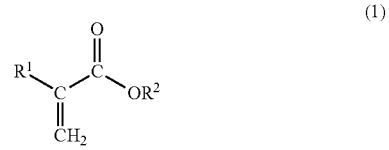

wherein $R^1$ represents a hydrogen atom or a methyl group, and $R^2$ represents an alkyl group having 12 to 30 carbon atoms, and a second monomer copolymerizable with the first monomer and having a reactive group capable of reacting with the curing agent.

[2] A resin composition comprising an acrylic resin and a curing agent, wherein the acrylic resin comprises a first structural unit represented by the following formula (2):

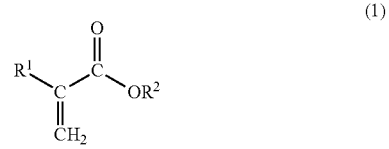

wherein $R^3$ represents a hydrogen atom or a methyl group, and $R^4$ represents an alkyl group having 12 to 30 carbon atoms, and a second structural unit having a reactive group capable of reacting with the curing agent.

[3] The resin composition according to [1] or [2], wherein the curing agent is at least one curing agent selected from the group consisting of an isocyanate curing agent, a phenolic curing agent, an amine curing agent, an imidazole curing agent, and an acid anhydride curing agent.

[4] The resin composition according to any one of [1] to [3], wherein the reactive group is at least one group selected from the group consisting of a carboxyl group, a hydroxyl group, an isocyanate group, an amino group, and an epoxy group.

[5] The resin composition according to [1], wherein a content of the first monomer is 60 parts by mass or more based on 100 parts by mass of the monomer components.

[6] The resin composition according to [1] or [5], wherein a content of the second monomer is 25 parts by mass or less based on 100 parts by mass of the monomer components.

[7] The resin composition according to [2], wherein a content of the first structural unit is 60 parts by mass or more based on 100 parts by mass of the entire structural units constituting the acrylic resin.

[8] The resin composition according to [2] or [7], wherein a content of the second structural unit is 25 parts by mass or less based on 100 parts by mass of the entire structural units constituting the acrylic resin.

[9] The resin composition according to any one of [1] to [8], wherein a content of the acrylic resin is 50 parts by mass or more based on 100 parts by mass of the resin composition.

[10] The resin composition according to any one of [1] to [9], wherein the reactive group is an epoxy group.

[11] The resin composition according to any one of [1] to [10], wherein the resin composition is liquid at 90° C.

[12] The resin composition according to [11], wherein a weight average molecular weight of the acrylic resin is 100000 or less.

[13] The resin composition according to [11] or [12], wherein a viscosity at 90° C. is 100 Pa·s or less.

[14] The resin composition according to any one of [1] to [10], wherein a weight average molecular weight of the acrylic resin is 200000 or more.

[15] The resin composition according to any one of [1] to [14], wherein the resin composition is for use in forming a heat storage material.

[16] The resin composition according to any one of [1] to [14], wherein the resin composition is for use in forming a water repellent material, a defrosting material, a refractive index adjusting material, a lubricant, an adsorbing material, a thermosetting stress relaxation material, or a low dielectric material.

[17] A heat storage material comprising a cured product of the resin composition according to any one of [1] to [16].

[18] A article comprising a heat source and a cured product of the resin composition according to any one of [1] to [16], the cured product provided to be in thermal contact with the heat source.

Advantageous Effects of Invention

According to an aspect of the present invention, it is possible to provide a resin composition suitably used for a heat storage material. According to another aspect of the present invention, it is possible to provide a heat storage material having an excellent heat storage capacity. In addition, a heat storage material according to an aspect of the present invention can suppress liquid leakage at or above the phase change temperature of the heat storage material and is excellent in heat resistance.

DESCRIPTION OF EMBODIMENTS

Figure 1:
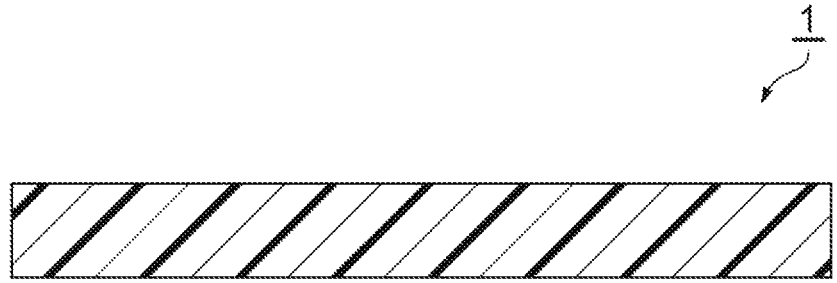
FIG. 1 is a schematic cross-sectional view showing a heat storage material according to an embodiment.

Hereinafter, embodiments of the present invention will be described in detail with reference to the drawings as appropriate. The present invention is not limited to the following embodiments.

"(Meth)acrylate" in the present specification means "acrylate" and its corresponding "methacrylate", and "(meth)acryloyl" means "acryloyl" and its corresponding "methacryloyl".

The weight average molecular weight (Mw) and the number average molecular weight (Mn) in the present specification are values measured under the following conditions using gel permeation chromatography (GPC) and determined using polystyrene as a standard substance.

Measuring instrument: HLC-8320GPC (product name, manufactured by Tosoh Corporation)

Analytical column: TSKgel SuperMultipore HZ-H (3 columns connected) (product name, manufactured by Tosoh Corporation)

Guard column: TSK guard column SuperMP (HZ)-H (product name, manufactured by Tosoh Corporation)

Eluent: THF

Measurement temperature: 25° C.

In the present specification, "excellent in heat resistance" means that the 1% weight reduction temperature in TG-DTA measurement is 280° C. or more.

A resin composition according to an embodiment contains an acrylic resin. The acrylic resin is a polymer obtained by polymerizing monomer components including a first monomer and a second monomer.

The first monomer is represented by the following formula (1):

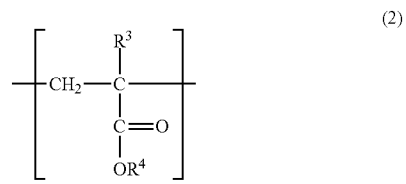

wherein $R^1$ represents a hydrogen atom or a methyl group, and $R^2$ represents an alkyl group having 12 to 30 carbon atoms.

The alkyl group represented by $R^2$ may be linear or branched. The number of carbon atoms of the alkyl group represented by $R^2$ is preferably 12 to 28, more preferably 12 to 26, still more preferably 12 to 24, and particularly preferably 12 to 22.

In other words, the first monomer is an alkyl (meth)acrylate having a linear or branched alkyl group having 12 to 30 carbon atoms at a terminal of an ester group. Examples of the first monomer include dodecyl (meth)acrylate (lauryl (meth)acrylate), tetradecyl (meth)acrylate, hexadecyl (meth)acrylate, octadecyl (meth)acrylate (stearyl (meth)acrylate), docosyl (meth)acrylate (behenyl (meth)acrylate), tetracosyl (meth)acrylate, hexacosyl (meth)acrylate, octacosyl (meth)acrylate. These first monomers may be used singly, or in combinations of two or more. The first monomer is preferably at least one selected from the group consisting of dodecyl (meth)acrylate (lauryl (meth)acrylate), hexadecyl (meth)acrylate, octadecyl (meth)acrylate (stearyl (meth) acrylate), and docosyl (meth)acrylate (behenyl (meth)acrylate).

The content of the first monomer based on 100 parts by mass of the monomer components is preferably 60 parts by mass or more, and more preferably 80 parts by mass or more, from the viewpoint of obtaining a sufficient heat storage capacity when the heat storage material is formed, and may be, for example, 98 parts by mass or less.

The second monomer is copolymerizable with the first monomer and is a monomer having a reactive group (reactive monomer). The second monomer includes a group having an ethylenically unsaturated bond (ethylenically unsaturated group) to be copolymerizable with the first monomer. Examples of the ethylenically unsaturated group include (meth)acryloyl group, vinyl group, and allyl group. The second monomer is preferably a monomer having a reactive group and a (meth)acryloyl group (a (meth)acryl monomer having a reactive group).

The reactive group in the second monomer is a group capable of reacting with a curing agent to be described later, and is, for example, at least one group selected from the group consisting of a carboxyl group, a hydroxyl group, an isocyanate group, an amino group, and an epoxy group. That is, the second monomer is, for example, a carboxyl group-containing monomer, a hydroxyl group-containing monomer, an isocyanate group-containing monomer, an amino group-containing monomer, or an epoxy group-containing monomer.

Examples of the carboxyl group-containing monomer include (meth)acrylic acid, carboxyethyl (meth)acrylate, carboxypentyl (meth)acrylate, itaconic acid, maleic acid, fumaric acid, crotonic acid, and isocrotonic acid.

Examples of the hydroxyl group-containing monomer include hydroxyalkyl (meth)acrylates such as 2-hydroxyethyl (meth)acrylate, 3-hydroxypropyl (meth)acrylate, 4-hydroxybutyl (meth)acrylate, 6-hydroxyhexyl (meth)acrylate, 8-hydroxyoctyl (meth)acrylate, 10-hydroxydecyl (meth) acrylate, 12-hydroxylauryl (meth)acrylate; and hydroxyalkylcycloalkane (meth)acrylates such as (4-hydroxymethylcyclohexyl) methyl (meth)acrylate. The hydroxyl group-containing monomer may be hydroxyethyl (meth) acrylamide, allyl alcohol, 2-hydroxyethyl vinyl ether, 4-hydroxybutyl vinyl ether, diethylene glycol monovinyl ether, or the like.

Examples of the isocyanate group-containing monomer include 2-methacryloyloxyethyl isocyanate and 2-acryloyloxyethyl isocyanate.

Examples of the amino group-containing monomer include N,N-dimethylaminoethyl (meth)acrylate, N,N-diethylaminoethyl (meth)acrylate, N,N-dimethylaminopropyl (meth)acrylate, and N,N-diethylaminopropyl (meth)acrylate.

Examples of the epoxy group-containing monomer include glycidyl (meth)acrylate, glycidyl α-ethyl (meth) acrylate, glycidyl α-n-propyl (meth)acrylate, glycidyl α-n-butyl (meth)acrylate, 3,4-epoxybutyl (meth)acrylate, 4,5-epoxypentyl (meth)acrylate, 6,7-epoxyheptyl (meth) acrylate, 6,7-epoxyheptyl α-ethyl(meth)acrylate, 3-methyl-3,4-epoxybutyl (meth)acrylate, 4-methyl-4,5-epoxypentyl (meth)acrylate, 5-methyl-5,6-epoxyhexyl (meth)acrylate, β-methylglycidyl (meth)acrylate, and β-methylglycidyl α-ethyl(meth)acrylate.

These second monomers may be used singly, or in combinations of two or more. The second monomer is preferably an epoxy group-containing monomer having an epoxy group as a reactive group, more preferably an epoxy group-containing (meth)acryl monomer, still more preferably glycidyl (meth)acrylate, and particularly preferably glycidyl methacrylate, from the viewpoint of increasing selection options of curing agent.

When the weight average molecular weight of the acrylic resin (details will be described later) is 200000 or more, the content of the second monomer is preferably 2 parts by mass or more, more preferably 3 parts by mass or more, still more preferably 5 parts by mass or more, and particularly preferably 8 parts by mass or more, based on 100 parts by mass of the monomer components, from the viewpoint of more excellent heat resistance of the heat storage material.

When the weight average molecular weight of the acrylic resin (details will be described later) is 100000 or less, the content of the second monomer is preferably 6 parts by mass or more, more preferably 7 parts by mass or more, and still more preferably 8 parts by mass or more, based on 100 parts by mass of the monomer components, from the viewpoint of excellent curability of the resin composition.

The content of the second monomer may be, regardless of the weight average molecular weight of the acrylic resin (details will be described later), 2 parts by mass or more and may be 25 parts by mass or less, and is preferably 20 parts by mass or less, more preferably 15 parts by mass or less, still more preferably 13 parts by mass or less, and particularly preferably 10 parts by mass or less, based on 100 parts by mass of the monomer components, from the viewpoint of excellent heat storage capacity of the heat storage material.

The monomer components can further contain another monomer as required in addition to the first monomer and the second monomer. Examples of the other monomer include alkyl (meth)acrylates having an alkyl group having less than 12 carbon atoms (1 to 11 carbon atoms) at a terminal of an ester group such as methyl (meth)acrylate, ethyl (meth)acrylate, propyl (meth)acrylate, and butyl (meth)acrylate; and cycloalkyl (meth)acrylate having a cyclic hydrocarbon group at a terminal of an ester group such as isobornyl (meth)acrylate and dicyclopentanyl (meth) acrylate. These other monomers may be used singly, or in combinations of two or more.

In an embodiment, the monomer components contain only the first monomer, the second monomer, and, as required, a third monomer which is at least one selected from the group consisting of alkyl (meth)acrylates having an alkyl group having 1 to 11 carbon atoms at a terminal of an ester group and cycloalkyl (meth)acrylates having a cyclic hydrocarbon group at a terminal of an ester group. In other words, in an embodiment, the monomer components do not contain a monomer other than the first monomer, the second monomer, and the third monomer (for example, a (meth) acryl monomer having a siloxane skeleton). In an embodiment, the monomer components may contain only the first monomer and the second monomer, and in another embodiment, may contain only the first monomer, the second monomer, and the third monomer.

The acrylic resin is obtained by polymerizing the monomer components including the first monomer, the second monomer, and another monomer used as required. The polymerization method can be appropriately selected from known polymerization methods such as various radical polymerizations, and may be, for example, a suspension polymerization method, a solution polymerization method, and a bulk polymerization method. As the polymerization method, when the weight average molecular weight of the acrylic resin is increased (for example, 200000 or more), suspension polymerization is preferably used, and when the weight average molecular weight of the acrylic resin is decreased (for example, 100000 or less), a solution polymerization method is preferably used.

When the suspension polymerization method is used, monomer components which become the raw material, a polymerization initiator, a chain transfer agent added as required, water, and a suspending agent are mixed to prepare a dispersion.

Examples of the suspending agent include water soluble polymers such as polyvinyl alcohol, methylcellulose, and polyacrylamide, and poorly soluble inorganic substances such as calcium phosphate and magnesium pyrophosphate. Among these, water soluble polymers such as polyvinyl alcohol are preferably used.

The amount of the suspending agent blended is preferably 0.005 to 1 part by mass, and more preferably 0.01 to 0.07 parts by mass based on 100 parts by mass of the total amount of the monomer components which is the raw material. When the suspension polymerization method is used, a molecular weight modifier such as a mercaptan-based compound, thioglycol, carbon tetrachloride, α-methylstyrene dimer may be further added as required. The polymerization temperature is preferably 0 to 200° C., and more preferably 40 to 120° C.

When the solution polymerization method is used, examples of the solvent to be used include aromatic solvents such as toluene and xylene, ketone solvents such as methyl ethyl ketone and methyl isobutyl ketone, ester solvents such as ethyl acetate and butyl acetate, chlorinated solvents such as carbon tetrachloride, and alcohol solvents such as 2-propanol and 2-butanol. The solid content concentration in the solution at the start of solution polymerization is preferably 40 to 70% by mass, and more preferably 50 to 60% by mass, from the viewpoint of polymerizability of the acrylic resin thus obtained. The polymerization temperature is preferably 0 to 200° C., and more preferably 40 to 120° C.

The polymerization initiator used in each polymerization method can be used without particular limitation as long as the polymerization initiator is a radical polymerization initiator. Examples of the radical polymerization initiator include organic peroxides such as benzoyl peroxide, lauroyl peroxide, di-t-butylperoxy hexahydroterephthalate, t-butylperoxy-2-ethylhexanoate, 1,1-t-butylperoxy-3,3,5-trimethylcyclohexane, and t-butylperoxyisopropyl carbonate, azo compounds such as azobisisobutyronitrile, azobis-4-methoxy-2,4-dimethylvaleronitrile, azobiscyclohexanone-1-carbonitrile, and azodibenzoyl.

The amount of the polymerization initiator blended is preferably 0.01 parts by mass or more, more preferably 0.05 parts by mass or more, and still more preferably 0.1 parts by mass or more, based on 100 parts by mass of the total amount of monomers, from the viewpoint of sufficiently polymerizing the monomers. The amount of the polymerization initiator blended is preferably 10 parts by mass or less, more preferably 5 parts by mass or less, and still more preferably 3 parts by mass or less, based on 100 parts by mass of the total amount of monomers, from the viewpoint that the molecular weight of the acrylic resin is in a suitable range and the decomposition products are suppressed, and a suitable adhesive strength is obtained when used as a heat storage material.

The acrylic resin thus obtained as described above has a structural unit derived from the first monomer and a structural unit derived from the second monomer. That is, the resin composition according to an embodiment contains an acrylic resin including a first structural unit (a structural unit derived from the first monomer) and a second structural unit (a structural unit derived from the second monomer).

The first structural unit is represented by the following formula (2):

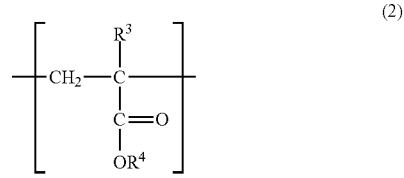

wherein $R^3$ represents a hydrogen atom or a methyl group, and $R^4$ represents an alkyl group having 12 to 30 carbon atoms.

The alkyl group represented by $R^4$ may be linear or branched. The number of carbon atoms of the alkyl group represented by $R^4$ is preferably 12 to 28, more preferably 12 to 26, still more preferably 12 to 24, and particularly preferably 12 to 22. Examples of the alkyl group represented by $R^4$ include a dodecyl group (lauryl group), a tetradecyl group, a hexadecyl group, an octadecyl group (stearyl group), a docosyl group (behenyl group), a tetracosyl group, a hexacosyl group, and an octacosyl group. The alkyl group represented by $R^4$ is preferably at least one selected from the group consisting of a dodecyl group (lauryl group), a hexadecyl group, an octadecyl group (stearyl group), and a docosyl group (behenyl group). The acrylic resin includes one or two or more of these first structural units.

The content of the first structural unit based on 100 parts by mass of the entire structural units constituting the acrylic resin is preferably 60 parts by mass or more, more preferably 80 parts by mass or more, from the viewpoint of excellent heat storage capacity of the heat storage material, and may be, for example, 98 parts by mass or less.

The second structural unit has a reactive group. The reactive group is a group capable of reacting with a curing agent to be described later, and is, for example, at least one group selected from the group consisting of a carboxyl group, a hydroxyl group, an isocyanate group, an amino group, and an epoxy group. The second structural unit is, for example, a structural unit derived from the above described carboxyl group-containing monomer, hydroxyl group-containing monomer, isocyanate group-containing monomer, amino group-containing monomer, or epoxy group-containing monomer. The second structural unit preferably has an epoxy group as the reactive group, more preferably a glycidyl group, from the viewpoint of increasing selection options of curing agent. The acrylic resin includes one or two or more of these second structural units.

The second structural unit is preferably represented by the following formula (3):

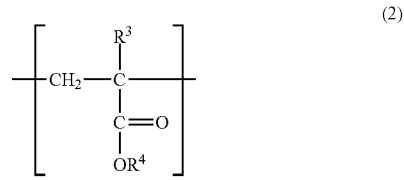

wherein $R^5$ represents a hydrogen atom or a methyl group, and $R^6$ represents a hydrogen atom or an organic group having a reactive group. The reactive group represented by $R^6$ may be the above described reactive group, and is preferably an organic group having an epoxy group, and more preferably a glycidyl group.

When the weight average molecular weight of the acrylic resin (details will be described later) is 200000 or more, the content of the second structural unit is preferably 2 parts by mass or more, more preferably 3 parts by mass or more, still more preferably 5 parts by mass or more, and particularly preferably 8 parts by mass or more, based on 100 parts by mass of the entire structural units constituting the acrylic resin, from the viewpoint of more excellent heat resistance of the heat storage material.

When the weight average molecular weight of the acrylic resin (details will be described later) is 100000 or less, the content of the second structural unit is preferably 6 parts by mass or more, more preferably 7 parts by mass or more, and still more preferably 8 parts by mass or more, based on 100 parts by mass of the entire structural units constituting the acrylic resin, from the viewpoint of excellent curability of the resin composition.

The content of the second structural unit may be, regardless of the weight average molecular weight of the acrylic resin (details will be described later), 2 parts by mass or more and may be 25 parts by mass or less, and is preferably 20 parts by mass or less, more preferably 15 parts by mass or less, still more preferably 13 parts by mass or less, and particularly preferably 10 parts by mass or less, based on 100 parts by mass of the entire structural units constituting the acrylic resin, from the viewpoint of obtaining a sufficient heat storage capacity when the heat storage material is formed.

The acrylic resin can further contain another structural unit as required in addition to the first structural unit and the second structural unit. The other structural unit may be a structural unit derived from the other monomers described above.

In an embodiment, the acrylic resin contains only the first structural unit, the second structural unit, and, as required, a third structural unit which is derived from at least one monomer selected from the group consisting of an alkyl (meth)acrylate having an alkyl group having 1 to 11 carbon atoms at a terminal of an ester group and a cycloalkyl (meth)acrylate having a cyclic hydrocarbon group at a terminal of an ester group. In other words, in an embodiment, the acrylic resin does not contain a structural unit other than the first structural unit, the second structural unit, and the third structural unit (for example, a structural unit derived from a (meth)acryl monomer having a siloxane skeleton). In an embodiment, the acrylic resin may contain only the first structural unit and the second structural unit, and in another embodiment, may contain only the first structural unit, the second structural unit, and the third structural unit.

The acrylic resin may be any of a random copolymer, a block copolymer, or a graft copolymer.

In an embodiment, the weight average molecular weight of the acrylic resin is preferably 200000 or more, more preferably 250000 or more, and still more preferably 300000 or more, from the viewpoint of excellent strength of the heat storage material. The weight average molecular weight of the acrylic resin is preferably 2000000 or less, more preferably 1500000 or less, and still more preferably 1000000 or less, from the viewpoint of easy handling of the resin composition.

In another embodiment, the weight average molecular weight of the acrylic resin is preferably 100000 or less, more preferably 70000 or less, and still more preferably 40000 or less, from the viewpoint of reducing the viscosity of the resin composition. In this case, the weight average molecular weight of the acrylic resin may be 5000 or more, for example.

The content of the acrylic resin is preferably 50 parts by mass or more, more preferably 70 parts by mass or more, and still more preferably 80 parts by mass or more, based on 100 parts by mass of the resin composition, from the viewpoint of excellent heat storage capacity of the heat storage material. The content of the acrylic resin may be 100 parts by mass or less, 99.5 parts by mass or less, or 99.3 parts by mass or less, based on 100 parts by mass of the resin composition.

For use in forming a heat storage material, the resin composition further contains a curing agent from the viewpoint of suppressing liquid leakage and volatilization of the heat storage material and improving heat resistance. The curing agent is a curing agent capable of reacting with the reactive group included in the second monomer (second structural unit). Examples of the curing agent include an isocyanate curing agent, a phenolic curing agent, an amine curing agent, an imidazole curing agent, an acid anhydride curing agent, and a carboxylic acid curing agent. These second curing agents may be used singly, or in combinations of two or more. When the reactive group is an epoxy group, the curing agent is preferably a phenolic curing agent or an imidazole curing agent.

Examples of the isocyanate curing agent include aromatic diisocyanates such as tolylene diisocyanate (2,4- or 2,6-tolylene diisocyanate, or a mixture thereof) (TDI), phenylene diisocyanate (m- or p-phenylene diisocyanate, or a mixture thereof), 4,4'-diphenyl diisocyanate, 1,5-naphthalene diisocyanate (NDI), diphenylmethane diisocyanate (4,4'-, 2,4'- or 2,2'-diphenylmethane diisocyanate, or a mixture thereof) (MDI), 4,4'-toluidine diisocyanate (TODI), and 4,4'-diphenyl ether diisocyanate, xylylene diisocyanate (1,3- or 1,4-xylylene diisocyanate, or a mixture thereof) (XDI), tetramethyl xylylene diisocyanate (1,3- or 1,4-tetramethylxylylene diisocyanate, or a mixture thereof) (TMXDI), and ω,ω'-diisocyanate-1,4-diethylbenzene. Examples of the isocyanate curing agent include aliphatic diisocyanates such as trimethylene diisocyanate, 1,2-propylene diisocyanate, butylene diisocyanate (tetramethylene diisocyanate, 1,2-butylene diisocyanate, 2,3-butylene diisocyanate, 1,3-butylene diisocyanate), 1,5-pentamethylene diisocyanate (PDI), 1,6-hexamethylene diisocyanate (HDI), 2,4,4- or 2,2,4-trimethylhexamethylene diisocyanate, and 2,6-diisocyanate methyl capate, and alicyclic diisocyanates such as 1,3-cyclopentane diisocyanate, 1,3-cyclopentene diisocyanate, cyclohexane diisocyanate (1,4-cyclohexane diisocyanate, 1,3-cyclohexane diisocyanate), 3-isocyanatomethyl-3,5,5-trimethylcyclohexyl isocyanate (isophorone diisocyanate) (IPDI), methylene bis(cyclohexyl isocyanate) (4,4'-, 2,4'- or 2,2'-methylene bis(cyclohexyl isocyanate), trans, trans-form, trans, cis-form, cis, cis-form, or a mixture thereof) (H12MDI), methylcyclohexane diisocyanate (methyl-2,4-cyclohexane diisocyanate, methyl-2,6-cyclohexane diisocyanate), norbornane diisocyanate (various isomers or a mixture thereof) (NBDI), and bis(isocyanatomethyl) cyclohexane (1,3- or 1,4-bis(isocyanatomethyl)cyclohexane or a mixture thereof) (H6XDI).

Examples of phenolic curing agent include bisphenol A, bisphenol F, bisphenol S, 4,4'-biphenylphenol, tetramethylbisphenol A, dimethyl bisphenol A, tetramethyl bisphenol F, dimethyl bisphenol F, tetramethyl bisphenol S, dimethyl bisphenol S, tetramethyl-4,4'-biphenol, dimethyl-4,4'-biphenylphenol, 1-(4-hydroxyphenyl)-2-[4-(1,1-bis-(4-hydroxyphenyl)ethyl) phenyl]propane, 2,2'-methylene-bis(4-methyl-6-tert-butylphenol), 4,4'-butylidene-bis(3-methyl-6-tert-butylphenol), trishydroxyphenylmethane, resorcinol, hydroquinone, pyrogallol, and phenols having a diisopropylidene skeleton; phenols having a fluorene skeleton such as 1,1-di-4-hydroxyphenylfluorene; cresols; ethylphenols; butylphenols; octylphenols; and novolac resins from, as a raw material, various phenols such as bisphenol A, bisphenol F, bisphenol S, and naphthols, and novolac resins such as a xylylene skeleton-containing phenol novolac resin, a dicyclopentadiene skeleton-containing phenol novolac resin, a biphenyl skeleton-containing phenol novolac resin, a fluorene skeleton-containing phenol novolac resin, and a furan skeleton-containing phenol novolac resin.

Examples of the amine curing agent include aromatic amines such as diaminodiphenylmethane, diaminodiphenylsulfone, diaminodiphenyl ether, p-phenylenediamine, m-phenylenediamine, o-phenylenediamine, 1,5-diaminonaphthalene, and m-xylylenediamine, and aliphatic amines such as ethylenediamine, diethylenediamine, isophoronediamine, and bis(4-amino-3-methyldicyclohexyl) methane, and polyetherdiamine; and guanidines such as dicyandiamide and 1-(o-tolyl) biguanide.

Examples of the imidazole curing agent include 2-methylimidazole, 2-ethyl-4-methylimidazole, 2-phenylimidazole, 2-undecylimidazole, 2-heptadecylimidazole, 2-phenyl-4-methylimidazole, 1-benzyl-2-phenylimidazole, 1-benzyl-2-methylimidazole, 1-cyanoethyl-2-methylimidazole, 1-cyanoethyl-2-phenylimidazole, 1-cyanoethyl-2-undecylimidazole, 2,3-dihydro-1H-pyrrolo-[1,2-a]benzimidazole, 2,4-diamino-6(2'-methylimidazole(1'))ethyl-s-triazine, 2,4-diamino-6(2'-undecylimidazole (1'))ethyl-s-triazine, 2,4-diamino-6(2'-ethyl, 4-methylimidazole(1'))ethyl-s-triazine, 2,4-diamino-6(2'-methylimidazole(1'))ethyl-s-triazine.isocyanuric acid adduct, 2-methylimidazoleisocyanuric acid adduct, 2-phenylimidazoleisocyanuric acid adduct, 2-phenyl-3,5-dihydroxymethylimidazole, 2-phenyl-4-methyl-5-hydroxymethylimidazole, and 1-cyanoethyl-2-phenyl-3,5-dicyanoethoxymethylimidazole.

Examples of the acid anhydride curing agent include aromatic carboxylic acid anhydrides such as phthalic anhydride, trimellitic anhydride, pyromellitic anhydride, benzophenone tetracarboxylic anhydride, ethylene glycol trimellitic anhydride, and biphenyltetracarboxylic anhydride; anhydrides of aliphatic carboxylic acids such as azelaic acid, sebacic acid, and dodecanedioic acid, alicyclic carboxylic acid anhydrides such as tetrahydrophthalic anhydride, hexahydrophthalic anhydride, nadic anhydride, het anhydride, and himic anhydride.

Examples of the carboxylic acid curing agent include succinic acid, glutaric acid, adipic acid, sebacic acid, phthalic acid, isophthalic acid, and terephthalic acid.

The content of the curing agent is preferably 0.01 parts by mass or more, preferably 10 parts by mass or less, more preferably 5 parts by mass or less, and still more preferably 1 part by mass or less, based on 100 parts by mass of the resin composition.

The resin composition can further contain another additive as required. Examples of the other additives include a curing accelerator, an antioxidant, a colorant, a filler, a crystal nucleating agent, a heat stabilizer, a heat conductive material, a plasticizer, a foaming agent, a flame retardant, and a vibration damping agent. These other additives may be used singly, or in combinations of two or more.

The resin composition preferably further contains a curing accelerator from the viewpoint of promoting the reaction between the acrylic resin and the curing agent. Examples of the curing accelerator include an organic phosphorus-based curing accelerator, a quaternary ammonium salt-based curing accelerator, and a tin catalyst. These curing accelerators may be used singly or in combinations of two or more.

The content of the curing accelerator is preferably 0.005 parts by mass or more, more preferably 0.01 parts by mass or more, and still more preferably 0.02 parts by mass or more, and is preferably 1 part by mass or less, more preferably 0.5 parts by mass or less, and still more preferably 0.2 parts by mass or less, based on 100 parts by mass of the resin composition.

The resin composition may be solid or liquid at 90° C., and is preferably liquid from the viewpoint of easy filling into a member having a complicated shape and widening the application range of the heat storage material.

The viscosity at 90° C. of the resin composition is preferably 100 Pa·s or less, more preferably 50 Pa·s or less, and still more preferably 20 Pa·s or less, from the viewpoint of excellent fluidity and handling properties. From the same viewpoint, the resin composition has a viscosity of preferably 100 Pa·s or less, more preferably 50 Pa·s or less, and still more preferably 20 Pa·s or less, at the melting point of the acrylic resin +20° C. The viscosity at 90° C. or at the melting point of the acrylic resin +20° C. of the resin composition may be 0.5 Pa·s or more, for example.

The viscosity of the resin composition means a value measured based on JIS Z 8803, and specifically means a value measured by an E-type viscometer (manufactured by Toki Sangyo Co., Ltd., PE-80L). It is possible for the viscometer calibration to be performed based on JIS Z 8809-JS14000. A melting point of an acrylic resin means a value measured by the method as described in Examples.

The resin composition described above is suitably used as a heat storage material by curing the resin composition (suitable as a resin composition for a heat storage material). That is, the heat storage material according to an embodiment includes a cured product of the above described resin composition. In this heat storage material, since the cured product of the acrylic resin functions as a component having heat storage properties, the heat storage material (resin composition) may not include a heat storage capsule encapsulating a latent heat storage material used in a conventional heat storage material, in an embodiment, for example, and even in this case, an excellent heat storage capacity is obtained.

The heat storage material (cured product of the resin composition described above) can be utilized in various fields. The heat storage material can be used, for example, air conditioning equipment in automobiles, buildings, public facilities, and underground malls (improvement of efficiency of air conditioning equipment), pipes in factories or the like (heat storage of pipes), automobile engines (heat insulation around the engine), electronic components (preventing temperature rise of electronic components), and fibers of underwear.

In each of these applications, the heat storage material (cured product of the above described resin composition) can store the heat of a heat source by being disposed to be in thermal contact with a heat source that generates heat in each of the applications. That is, an embodiment of the present invention is an article including a heat source and a heat storage material (cured product of the above described resin composition) provided to be in thermal contact with the heat source.

For example, in the case of being used together with an electronic component, the heat storage material (cured product of the above described resin composition) can store the heat generated in the electronic component by being disposed to be in thermal contact with the electronic component (directly in contact with the electronic component or in contact through a member having thermal conductivity). In this case, for example, when the heat storage material is disposed to be further in thermal contact with the heat dissipation member, it is possible to gradually release the heat stored in the heat storage material, and it is possible to suppress that the heat generated in the electronic component is rapidly released to the outside (the vicinity of the electronic component locally reaches a high temperature).

FIG. 1 is a schematic cross-sectional view showing a heat storage material according to an embodiment. As shown in FIG. 1, the heat storage material 1 is made of the cured product of the above described resin composition and may be sheet-like (film-like), for example.

When the resin composition is solid at 90° C., the heat storage material 1 is obtained by, for example, heating and melting and molding the resin composition. That is, a producing method of the heat storage material 1 includes a step of molding (molding step) by heating and melting the resin composition in an embodiment. The molding in the molding step may be injection molding, compression molding, or transfer molding. In this case, the heat storage material 1 does not require a casing, and it is possible for the heat storage material 1 to be attached singly to an object to be attached, to be wound, or to be attached in various states.

Figure 2:
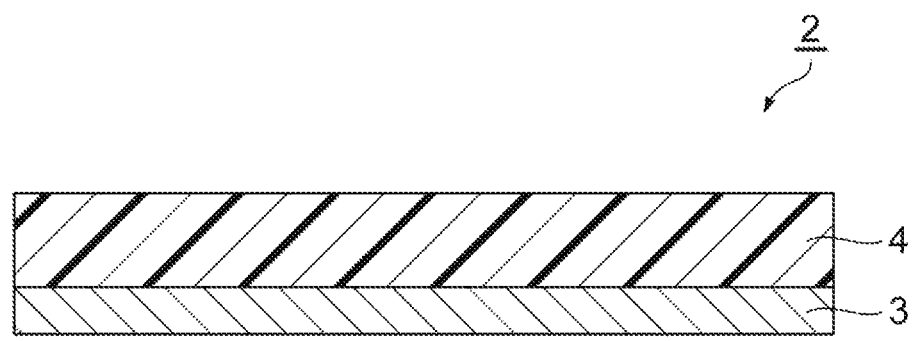
FIG. 2 is a schematic cross-sectional view showing a heat control sheet according to an embodiment.

The heat storage material in the case where the resin composition is solid at 90° C. is suitably used for a heat control sheet in an embodiment. FIG. 2 is a schematic cross-sectional view showing a heat control sheet according to an embodiment. As shown in FIG. 2, the heat control sheet 2 includes a metal layer 3 and a heat storage layer 4 provided on the metal layer 3.

The metal layer 3 is constituted by, for example, aluminum or copper. The thickness of the metal layer 3 is, for example, 100 μm or less.

The heat storage layer 4 is made of the above described heat storage material 1. The thickness of the heat storage layer 4 is, for example, 1 to 30 mm, 2 to 20 mm, or 5 to 10 mm.

The heat control sheet 2 is obtained, for example, by pressure-laminating the heat storage material 1 and the metal layer 3. In this case, the heat storage material 1 may be heated at or below the temperature at which the shape is maintained as required.

When the resin composition is liquid at 90° C., the heat storage material is obtained by, for example, filling a gap portion of a member with the resin composition and thereafter curing the resin composition. That is, the heat storage material is obtained by filling a gap portion of a member with the resin composition and curing the filling resin composition in another embodiment. In this case, since the heat storage material can be formed by filling and curing a liquid resin composition, it is possible to be used in various places, and a corrugated shape can be suitably used between members, for example.

Figure 3:
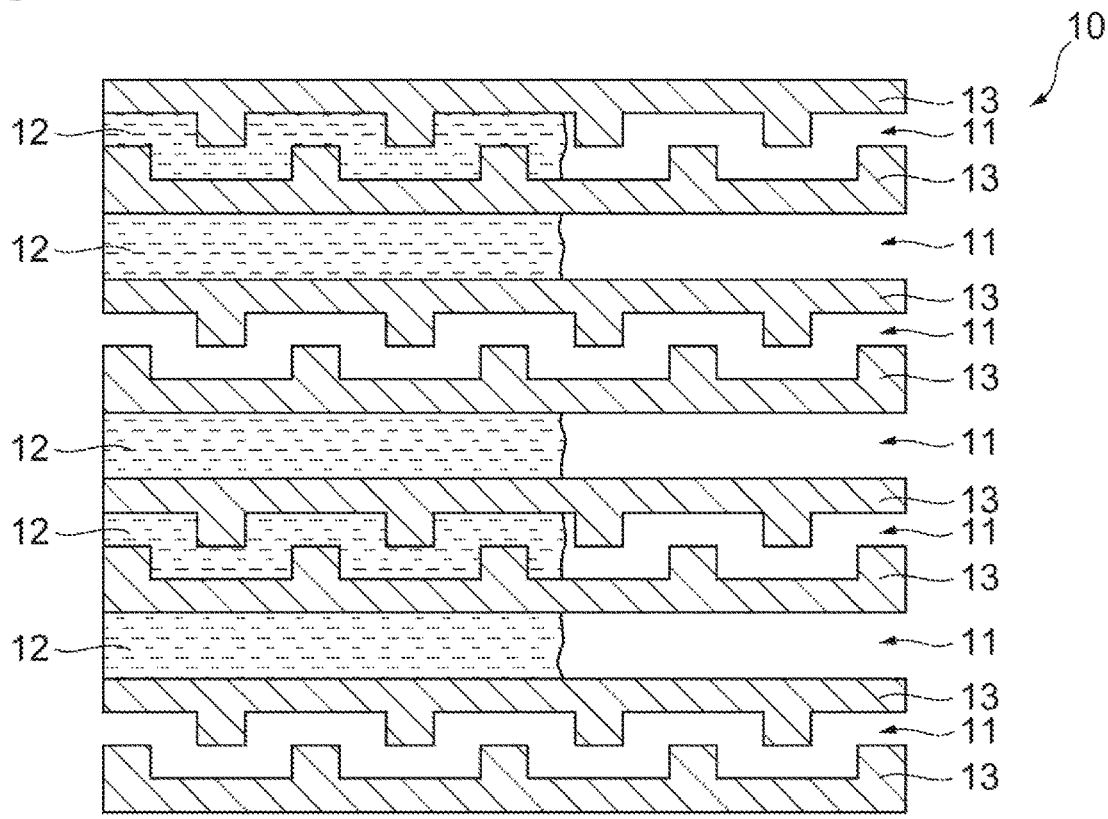
FIG. 3 is a schematic cross-sectional view showing a heat control material according to an embodiment.
Figure 3:
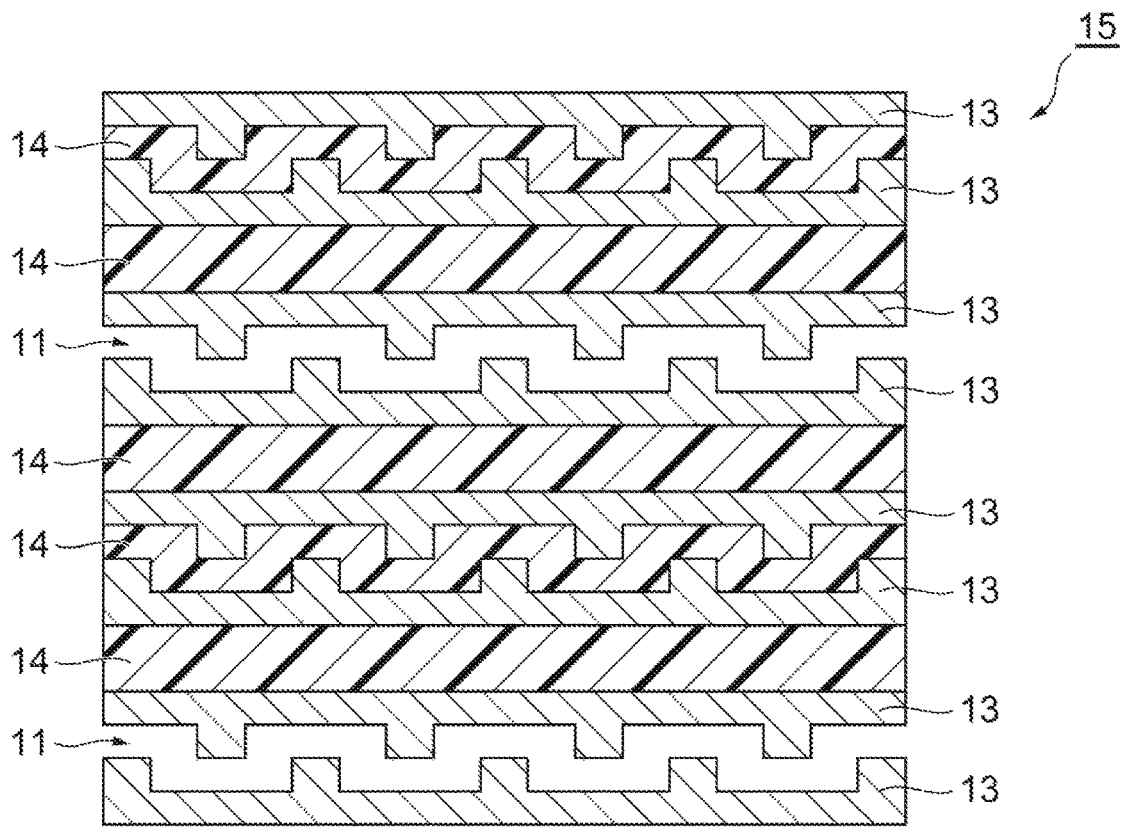

The heat storage material in the case where the resin composition is liquid at 90° C. is suitably used for a heat control material in an embodiment. FIG. 3 is a schematic cross-sectional view for explaining a heat control material according to an embodiment. As shown in (b) of FIG. 3, the heat control material 15 includes a plurality of metal layers (metal members) 13 and a heat storage layers 14 filling (provided) between the plurality of metal layers 13. The configurations of the metal layer 13 and the heat storage layer 14 may be the same as those of the metal layer 3 and the heat storage layer 4 in the above described heat control sheet. The metal layer 13 may have a corrugated shape. The heat control material 15 may further include a gap portion 11 between a part of the metal layers 13 and 13. The gap portion 11 functions as, for example, an air cooling passage through which air for air cooling passes.

As shown in (a) of FIG. 3, the heat control material 15 is obtained by, for example, filling a part of the gap portions 11 with the liquid resin composition 12 with respect to a metal member 10 including a plurality of the metal layers 13 and a plurality of the gap portions 11 provided between a part of the metal layers 13 and 13, and thereafter curing the resin composition 12.

In the heat control sheet 2 and the heat control material 15, the reflectance of sunlight is large at a high temperature (for example, 20° C. or more), and the reflectance of sunlight is low at a low temperature (for example, 15° C. or less). The heat control sheet 2 and the heat control material 15 are used for a roof and a road, for example. By laying the heat control sheet 2 or the heat control material 15 on a roof, a road, or the like, the heat storage layers 4 and 14 become transparent at the time of a high temperature (for example, summer), and thus the metal layers 3 and 13 reflect solar heat and the heat control sheet 2 or the heat control material 15 can suppress a temperature increase of the roof, the road, and the like. On the other hand, the heat storage layers 4 and 14 become opaque at the time of a low temperature (for example, in winter), and in this case, the metal layers 3 and 13 do not reflect solar heat and the heat storage layers 4 and 14 absorb heat, and thus a temperature decrease of the roof, the road or the like is suppressed. That is, the heat control sheet 2 and the heat control material 15 can achieve the temperature increase suppression at a high temperature and the temperature decrease suppression at a low temperature, and are utilized as an auxiliary function of an air conditioner.

In another embodiment, it is possible to use the above described resin composition for applications other than the heat storage material. The resin composition is suitably used for, for example, forming a water repellent material, a defrosting material, a refractive index adjusting material, a lubricant, an adsorbing material, a thermosetting stress relaxation material, or a low dielectric material. The water repellent material, the defrosting material, the refractive index adjusting material, the lubricant, the adsorbing material, the thermosetting stress relaxation material, and the low dielectric material each may include, for example, the cured product of the above-described resin composition.

EXAMPLES

Hereinafter, although Examples demonstrate the present invention further more concretely, the present invention is not limited to the following Examples.

[Synthesis of Acrylic Resin]

Acrylic resins 1A to 1F used in Examples 1-1 to 1-11 and an acrylic resin 1G used in Comparative Example 1-1 were synthesized by a known suspension polymerization method as follows.

(Synthesis Example of Acrylic Resin 1A)

A 500 mL flask constituted from a stirrer, a thermometer, a nitrogen gas inlet tube, a discharge tube, and a heating jacket was used as a reactor, and nitrogen has flowed through the flask at 100 mL/min.

Next, 85 g of stearyl acrylate, 10 g of butyl acrylate, and 5 g of glycidyl methacrylate were mixed as monomers, 0.41 g of lauroyl peroxide as a polymerization initiator, and 0.12 g of n-octyl mercaptan as a chain transfer agent were further added and dissolved to obtain a mixture. Then, with respect to the mixture, 201.3 g of water (200 parts by mass based on 100 parts by mass of the mixture) and 0.2 g of polyvinyl alcohol (PVA) as a dispersion aid (0.02 parts by mass based on 100 parts by mass of the mixture) were added to prepare a dispersion.

Subsequently, the dispersion was supplied into the flask (reactor) in which nitrogen had flowed so as to reduce dissolved oxygen to 1 ppm or less, and heated while stirring at a reactor internal temperature of 60° C. and a stirring rotation speed of 250 times/min, and the mixture was allowed to react for 4 hours. The polymerization rate was calculated from the specific gravity of the resin produced while sampling during the reaction, and after confirming that the polymerization rate was 80% or more, the temperature was raised to 90° C., and the mixture was allowed to react for 2 hours. Thereafter, the product in the reactor was cooled, the product was taken out, washed with water, dehydrated, and dried to obtain acrylic resin 1A. The weight average molecular weight (Mw) of the acrylic resin 1A was 700000.

The acrylic resins 1B to 1F and the acrylic resin 1G were synthesized by the same method as in the synthesis example of the acrylic resin 1A, except that the monomer components were changed to the monomer components shown in Table 1. The weight average molecular weights (Mw) of the respective acrylic resins thus obtained are altogether shown in Table 1.

(Synthesis Example of Acrylic Resin 2A)

A 500 mL flask constituted from a stirrer, a thermometer, a nitrogen gas inlet tube, a discharge tube, and a heating jacket was used as a reactor, and nitrogen flowed through the flask at 100 mL/min.

Next, 90 g of hexadecyl acrylate and 10 g of glycidyl methacrylate as monomers and 81.8 g of 2-propanol as a solvent were mixed. The reactor internal temperature was raised to 60° C. while stirring at a stirring rotation speed of 250 times/min, and after the temperature was raised to 60° C., 0.3 g of azobisisobutyronitrile was added to the reactor, and the mixture was allowed to react for 7 hours. Thereafter, the solvent was removed under reduced pressure to obtain the acrylic resin 2A. The weight average molecular weight (Mw) of the acrylic resin 2A was 35000.

The acrylic resins 2B to 2J were synthesized by the same method as in the synthesis example of the acrylic resin 2A, except that the monomer components were changed to the monomer components shown in Tables 2 and 3. The weight average molecular weights (Mw) and the melting points of the respective acrylic resins thus obtained are altogether shown in Tables 2 and 3.

The melting point of the acrylic resin was measured as follows.

Using a differential scanning calorimeter (manufactured by Perkin Elmer, model number DSC8500), by raising the temperature to 100° C. at 20° C./min, holding at 100° C. for 3 minutes, and then lowering to −30° C. at a rate of 10°

TABLE 1

|  |  | Acrylic resin | | | | | | |
|---|---|---|---|---|---|---|---|---|
|  |  | 1A | 1B | 1C | 1D | 1E | 1F | 1G |
| Monomer components (parts by mass) | Lauryl acrylate | — | — | 95 | — | — | — | — |
|  | Hexadecyl acrylate | — | — | — | 95 | — | — | — |
|  | Stearyl acrylate | 85 | 90 | — | — | — | 85 | — |
|  | Behenyl acrylate | — | — | — | — | 85 | — | — |
|  | Glycidyl methacrylate | 5 | 10 | 5 | 5 | 5 | — | 5 |
|  | 4-Hydroxybutyl acrylate | — | — | — | — | — | 5 | — |
|  | Butyl acrylate | 10 | — | — | — | 10 | 10 | 95 |
| Weight average molecular weight (Mw) |  | 700000 | 650000 | 700000 | 700000 | 700000 | 700000 | 700000 |

[Synthesis of Acrylic Resin]

The acrylic resins 2A to 2J used in Examples 2-1 to 2-10 and in Comparative Examples 2-1 to 2-2 were synthesized by a known solution polymerization method as follows.

C./min, and subsequently holding at −30° C. for 3 minutes, and then raising again to 100° C. at a rate of 10° C./min, the thermal behavior of the acrylic resin was measured, and the melting peak was calculated as the melting point of the acrylic resin.

TABLE 2

|  |  | Acrylic resin | | | | |
|---|---|---|---|---|---|---|
|  |  | 2A | 2B | 2C | 2D | 2E |
| Monomer components (parts by mass) | Lauryl acrylate | — | — | — | 90 | — |
|  | Tetradecyl acrylate | — | — | — | — | 90 |
|  | Hexadecyl acrylate | 90 | 93 | 80 | — | — |
|  | Stearyl acrylate | — | — | — | — | — |
|  | Behenyl acrylate | — | — | — | — | — |
|  | Glycidyl methacrylate | 10 | 7 | 10 | 10 | 10 |
|  | 4-Hydroxybutyl acrylate | — | — | — | — | — |
|  | Butyl acrylate | — | — | 10 | — | — |

TABLE 2-continued

| | Acrylic resin | | | | |
|---|---|---|---|---|---|
| | 2A | 2B | 2C | 2D | 2E |
| Weight average molecular weight (Mw) | 35000 | 62000 | 38000 | 35000 | 35000 |
| Melting point (° C.) | 28 | 30 | 25 | 0 | 15 |

TABLE 3

| | | Acrylic resin | | | |
|---|---|---|---|---|---|
| | | 2F | 2G | 2H | 2I |
| Monomer components (parts by mass) | Lauryl acrylate | — | — | — | — |
| | Tetradecyl acrylate | — | — | — | — |
| | Hexadecyl acrylate | — | — | 80 | — |
| | Stearyl acrylate | 80 | — | — | — |
| | Behenyl acrylate | — | 80 | — | — |
| | Glycidyl methacrylate | 10 | 10 | — | 5 |
| | 4-Hydroxybutyl acrylate | — | — | 10 | — |
| | Butyl acrylate | 10 | 10 | 10 | 95 |
| Weight average molecular weight (Mw) | | 36000 | 35000 | 35000 | 38000 |
| Melting point (° C.) | | 40 | 51 | 25 | — |

Lauryl acrylate and 4-hydroxybutyl acrylate being those manufactured by Osaka Organic Chemical Industry Co., Ltd., tetradecyl acrylate being those manufactured by Tokyo Chemical Industry Co., Ltd., hexadecyl acrylate and butyl acrylate being those manufactured by Wako Pure Chemical Industries, Ltd., stearyl acrylate, behenyl acrylate, and glycidyl methacrylate being those manufactured by NOF Corporation were used.

[Production of Heat Storage Material]

Example 1-1

15 g of acrylic resin 1A, and 0.24 g of 3-methyl-hexahydrophthalic anhydride (manufactured by Hitachi Chemical Co., Ltd., trade name "HN5500") and 0.03 g (solid content ratio) of 1-cyanoethyl-2-phenylimidazole (manufactured by Shikoku Kasei Kogyo Co., Ltd., trade name "CUREZOL 2PZ-CN") as curing agents were blended and kneaded at 100° C. for 30 minutes to obtain a resin composition. Next, the resin composition was filled into a 10 cm×10 cm×1 mm formwork (SUS plate), covered with a SUS plate, and then cured at 180° C. for 1.5 hours under a pressure of 60 kPa, to obtain a sheet-like heat storage material having a thickness of 1 mm.

Examples 1-2 to 1-10, Reference Example 1-1, Comparative Example 1-1

Heat storage materials were produced in the same manner as in Example 1-1 except that the composition of the resin composition was changed as shown in Tables 4 and 5.

Example 2-1

9.8 g of acrylic resin 2A, and 0.2 g (solid content ratio) of 1-cyanoethyl-2-phenylimidazole (manufactured by Shikoku Kasei Kogyo Co., Ltd., trade name "CUREZOL 2PZ-CN") as a curing agent were blended to obtain a resin composition. The viscosity at 90° C. of this resin composition was measured based on JIS Z 8803 using an E-type viscometer (manufactured by Toki Sangyo Co., Ltd., PE-80L). The result is shown in Table 6.

Next, the resin composition was filled into a 10 cm×10 cm×1 mm formwork (SUS plate), covered with a SUS plate, and then cured at 180° C. for 1.5 hours under a pressure of 60 kPa, to obtain a sheet-like heat storage material having a thickness of 1 mm.

Examples 2-2 to 2-12, Comparative Example 2-1

Measurement of the viscosities of the resin compositions and preparation of heat storage materials were carried out in the same manner as in Example 2-1 except that the formulation of the resin composition was changed as shown in Tables 6 to 8. The results are shown in Tables 6 to 8.

[Evaluation of Melting Point and Heat Storage Capacity]

Each of the heat storage materials produced in Examples and Comparative Examples was measured using a differential scanning calorimeter (manufactured by Perkin Elmer, model number DSC8500), and melting point and the heat storage capacity were calculated. Specifically, by raising the temperature to 100° C. at 20° C./min, holding at 100° C. for 3 minutes, and then lowering to −30° C. at a rate of 10° C./min, and subsequently holding at −30° C. for 3 minutes, and then raising again to 100° C. at a rate of 10° C./min, the thermal behavior was measured. The melting peak was set to the melting point of the heat storage material, and the area was set to the heat storage capacity. The results are shown in Tables 4 to 8. Note that when the heat storage capacity is 30 kg or more, it can be said that the heat storage capacity is excellent.

[Evaluation of Liquid Leakage and Volatility]

Each of the heat storage materials produced in Examples and Comparative Examples was measured for weight change before and after standing for 1000 hours in the air atmosphere at a temperature of 80° C. to measure a weight reduction rate (%). The results are shown in Tables 4 to 8.

[Heat Resistance Test (TG-DTA)]

Using a thermogravimetric balance TG-DTA6300 (Hitachi High-Tech Science Corporation (Hitachi High-Technologies Corporation)), the weight reduction of each of the heat storage materials produced in Examples and Comparative Examples was measured. The temperature (° C.) at which 1% weight was reduced from the initial weight was read and set to the value of 1% weight reduction temperature. The results are shown in Tables 4 to 8.

TABLE 4

| | | | Example 1-1 | Example 1-2 | Example 1-3 | Example 1-4 | Example 1-5 | Example 1-6 |
|---|---|---|---|---|---|---|---|---|
| Formulation (parts by mass) | Acrylic resin | 1A | 98.0 | 98.0 | 98.5 | 98.0 | 99.3 | — |
| | | 1B | — | — | — | — | — | 99.3 |
| | | 1C | — | — | — | — | — | — |
| | | 1D | — | — | — | — | — | — |
| | | 1E | — | — | — | — | — | — |
| | | 1F | — | — | — | — | — | — |
| | | 1G | — | — | — | — | — | — |
| | Curing agent | HN5500 | 1.5 | — | — | — | — | — |
| | | HP850 | — | 1.5 | — | — | — | — |
| | | IPDI | — | — | 1.5 | — | — | — |
| | | HMDA | — | — | — | 1.5 | — | — |
| | | 2PZCN | 0.5 | 0.5 | — | 0.5 | 0.7 | 0.7 |
| Melting point (° C.) | | | 38 | 37 | 38 | 38 | 38 | 43 |
| Heat storage capacity (J/g) | | | 78 | 75 | 78 | 78 | 79 | 72 |
| Liquid leakage and volatility (%) | | | <1 | <1 | <1 | <1 | <1 | <1 |
| Heat resistance (° C.) | | | 290 | 290 | 300 | 295 | 300 | 330 |

TABLE 5

| | | | Example 1-7 | Example 1-8 | Example 1-9 | Example 1-10 | Reference Example 1-1 | Comparative Example 1-1 |
|---|---|---|---|---|---|---|---|---|
| Formulation (parts by mass) | Acrylic resin | 1A | — | — | — | — | 100 | — |
| | | 1B | — | — | — | — | — | — |
| | | 1C | 99.3 | — | — | — | — | — |
| | | 1D | — | 99.3 | — | — | — | — |
| | | 1E | — | — | 99.3 | — | — | — |
| | | 1F | — | — | — | 98.5 | — | — |
| | | 1G | — | — | — | — | — | 99.3 |
| | Curing agent | HN5500 | — | — | — | — | — | — |
| | | HP850 | — | — | — | — | — | — |
| | | IPDI | — | — | — | 1.5 | — | — |
| | | HMDA | — | — | — | — | — | — |
| | | 2PZCN | 0.7 | 0.7 | 0.7 | — | — | 0.7 |
| Melting point (° C.) | | | 0 | 30 | 60 | 40 | 40 | — |
| Heat storage capacity (J/g) | | | 40 | 62 | 93 | 75 | 79 | 0 |
| Liquid leakage and volatility (%) | | | <1 | <1 | <1 | <1 | 1.5 | <1 |
| Heat resistance (° C.) | | | 298 | 300 | 310 | 280 | 275 | 290 |

TABLE 6

| | | | | Example 2-1 | Example 2-2 | Example 2-3 | Example 2-4 | Example 2-5 |
|---|---|---|---|---|---|---|---|---|
| Resin composition | Formulation (parts by mass) | Acrylic resin | 2A | 98.0 | 98.0 | 98.5 | 98.0 | 98.0 |
| | | Curing agent | 2PZCN | 2.0 | 0.5 | — | 0.5 | 0.5 |
| | | | HP850 | — | 1.5 | — | — | — |
| | | | IPDI | — | — | 1.5 | — | — |
| | | | HMDA | — | — | — | 1.5 | — |
| | | | HN5500 | — | — | — | — | 1.5 |
| | Viscosity (Pa·s) | | | 3.8 | 3.8 | 4.0 | 4.0 | 4.1 |
| Heat storage material | Melting point (° C.) | | | 26 | 26 | 27 | 27 | 27 |
| | Heat storage capacity (J/g) | | | 72 | 70 | 68 | 68 | 66 |
| | Liquid leakage and volatility (%) | | | <1 | <1 | <1 | <1 | <1 |
| | Heat resistance (° C.) | | | 286 | 293 | 276 | 295 | 300 |

TABLE 7

| | | | | Example 2-6 | Example 2-7 | Example 2-8 | Example 2-9 |
|---|---|---|---|---|---|---|---|
| Resin composition | Formulation (parts by mass) | Acrylic resin | 2B | 98.0 | — | — | — |
| | | | 2C | — | 98.0 | — | — |
| | | | 2D | — | — | 98.0 | — |

TABLE 7-continued

|   |   |   | Example 2-6 | Example 2-7 | Example 2-8 | Example 2-9 |
|---|---|---|---|---|---|---|
|   |   | 2E | — | — | — | 98.0 |
|   |   | 2F | — | — | — | — |
|   | Curing agent | 2PZCN | 2.0 | 2.0 | 2.0 | 2.0 |
|   | Viscosity (Pa · s) |   | 16.2 | 4.2 | 3.6 | 3.8 |
| Heat storage material | Melting point (° C.) |   | 30 | 25 | 0 | 13 |
|   | Heat storage capacity (J/g) |   | 75 | 58 | 45 | 67 |
|   | Liquid leakage and volatility (%) |   | <1 | <1 | <1 | <1 |
|   | Heat resistance (° C.) |   | 295 | 298 | 280 | 283 |

TABLE 8

|   |   |   |   | Example 2-10 | Example 2-11 | Example 2-12 | Comparative Example 2-1 |
|---|---|---|---|---|---|---|---|
| Resin composition | Formulation (parts by mass) | Acrylic resin | 2F | 98.0 | — | — | — |
|   |   |   | 2G | — | 98.0 | — | — |
|   |   |   | 2H | — | — | 98.0 | — |
|   |   |   | 2I | — | — | — | 98.0 |
|   |   | Curing agent | 2PZCN | 2.0 | 2.0 | 2.0 | 2.0 |
|   | Viscosity (Pa · s) |   |   | 5.1 | 4.5 | 12.1 | 15.3 |
| Heat storage material | Melting point (° C.) |   |   | 37 | 48 | 24 | — |
|   | Heat storage capacity (J/g) |   |   | 80 | 90 | 59 | 0 |
|   | Liquid leakage and volatility (%) |   |   | <1 | <1 | <1 | <1 |
|   | Heat resistance (° C.) |   |   | 280 | 286 | 280 | 290 |

In Tables 4 to 8, HN5500 represents 3 or 4-methyl-hexahydrophthalic anhydride (manufactured by Hitachi Chemical Co., Ltd.), HP850 phenol novolac (manufactured by Hitachi Chemical Co., Ltd.), IPDI isophorone diisocyanate (manufactured by Sumika Bayer Urethane Co., Ltd.), HMDA hexamethylenediamine (manufactured by Wako Pure Chemical Industries, Ltd.), and 2PZCN 1-cyanoethyl-2-phenylimidazole (manufactured by Shikoku Kasei Kogyo Co., Ltd.), respectively.

The heat storage materials of Examples are excellent in the heat storage capacity, and in addition, are excellent in heat resistance and can suppress liquid leakage and volatilization. In particular, the heat storage materials of Examples 2-1 to 2-12 are obtained by curing a liquid resin composition, and thus is advantageous in terms of being applicable to a member having a complicated shape.

INDUSTRIAL APPLICABILITY

Since the heat storage material of the present invention is excellent in the heat storage capacity, and in addition, is excellent in heat resistance and can suppress liquid leakage and volatilization, it is possible to be used, in particular, without being packed in a bag or the like in a field requiring heat resistance. Further, when the resin composition is liquid, the heat storage material is obtained by filling and curing the resin composition, and thus is applicable to a member having a complicated shape.

REFERENCE SIGNS LIST

1: Heat storage material, 2: Heat control sheet, 3,13: Metal layer, 4,14: Heat storage layer, 15: Heat control material.

The invention claimed is:
1. A resin composition comprising:
an acrylic resin; and
a curing agent,
wherein the acrylic resin is a resin obtained by polymerizing monomer components comprising a first monomer represented by the following formula (1):

(1)

wherein $R^1$ represents a hydrogen atom or a methyl group, and $R^2$ represents an alkyl group having 12 to 30 carbon atoms, and a second monomer copolymerizable with the first monomer and having a reactive group capable of reacting with the curing agent, wherein a content of the first monomer is 60 parts by mass or more based on 100 parts by mass of the monomer components, a content of the second monomer is 2 parts by mass or more and 25 parts by mass or less based on 100 parts by mass of the monomer components, and wherein a weight average molecular weight of the acrylic resin is 200000 or more.

2. A resin composition comprising:
an acrylic resin; and
a curing agent,
wherein the acrylic resin comprises a first structural unit represented by the following formula (2):

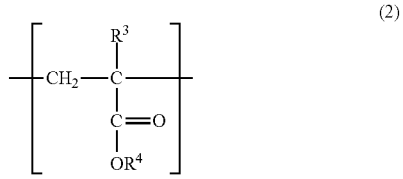

(2)

wherein R³ represents a hydrogen atom or a methyl group, and R⁴ represents an alkyl group having 12 to 30 carbon atoms, and a second structural unit having a reactive group capable of reacting with the curing agent, wherein a content of the first structural unit is 60 parts by mass or more based on 100 parts by mass of the entire structural units constituting the acrylic resin, a content of the second structural unit is 2 parts by mass or more and 25 parts by mass or less based on 100 parts by mass of the entire structural units constituting the acrylic resin, and wherein a weight average molecular weight of the acrylic resin is 200000 or more.

3. The resin composition according to claim 1, wherein the curing agent is at least one curing agent selected from the group consisting of an isocyanate curing agent, a phenolic curing agent, an amine curing agent, an imidazole curing agent, and an acid anhydride curing agent.

4. The resin composition according to claim 1, wherein the reactive group is at least one group selected from the group consisting of a carboxyl group, a hydroxyl group, an isocyanate group, an amino group, and an epoxy group.

5. The resin composition according to claim 1, wherein a content of the acrylic resin is 50 parts by mass or more based on 100 parts by mass of the resin composition.

6. The resin composition according to claim 1, wherein the reactive group is an epoxy group.

7. The resin composition according to claim 1, wherein the resin composition is liquid at 90° C.

8. The resin composition according to claim 7, wherein a viscosity at 90° C. is 100 Pa·s or less.

9. The resin composition according to claim 1, wherein the resin composition is for use in forming a heat storage material.

10. The resin composition according to claim 1, wherein the resin composition is for use in forming a water repellent material, a defrosting material, a refractive index adjusting material, a lubricant, an adsorbing material, a thermosetting stress relaxation material, or a low dielectric material.

11. A heat storage material comprising a cured product of the resin composition according to claim 1.

12. An article comprising:
a heat source; and
a cured product of the resin composition according to claim 1, the cured product provided to be in thermal contact with the heat source.

13. The resin composition according to claim 1, wherein the content of the second monomer is 3 parts by mass or more and 25 parts by mass or less based on 100 parts by mass of the monomer components.

14. The resin composition according to claim 2, wherein a content of the second structural unit is 3 parts by mass or more and 25 parts by mass or less based on 100 parts by mass of the entire structural units constituting the acrylic resin.

* * * * *